United States Patent [19]

Grabitz

[11] Patent Number: 4,701,331

[45] Date of Patent: Oct. 20, 1987

[54] NON-DUSTY BLENDS OF MEALS OR FLOURS WITH ACTIVE PRINCIPLES FOR USE IN FODDER PRODUCTION

[75] Inventor: Ernst B. Grabitz, Casatenovo, Italy

[73] Assignee: DOX-AL Italia SpA, Correzzana, Italy

[21] Appl. No.: 831,613

[22] Filed: Feb. 21, 1986

[30] Foreign Application Priority Data

Apr. 12, 1985 [IT] Italy ............................. 29315 A/85

[51] Int. Cl.⁴ .............................................. A23K 1/00
[52] U.S. Cl. .................................. 426/302; 426/335; 426/532; 426/623; 426/635; 426/630
[58] Field of Search ............... 426/622, 623, 630, 635, 426/302, 335, 532, 807

[56] References Cited

U.S. PATENT DOCUMENTS

| | | | |
|---|---|---|---|
| 3,582,355 | 6/1971 | Hunt | 426/622 |
| 4,042,716 | 8/1977 | Bertram et al. | 426/635 |
| 4,197,320 | 4/1980 | Betz et al. | 426/623 |
| 4,542,031 | 9/1985 | Nakajima et al. | 426/623 |

*Primary Examiner*—Raymond N. Jones
*Assistant Examiner*—Marianne M. Cintins
*Attorney, Agent, or Firm*—Stevens, Davis, Miller & Mosher

[57] ABSTRACT

Process for the preparation of blends for use in fodder preparation constituted by flours, or meals, and active principles, of low dustiness is disclosed wherein to the carrier substance the active principle and a non-ionic physiologically compatible surfactant are added, which are incorporated into the carrier substance by blending.

7 Claims, No Drawings

NON-DUSTY BLENDS OF MEALS OR FLOURS WITH ACTIVE PRINCIPLES FOR USE IN FODDER PRODUCTION

DISCLOSURE

The present invention relates to a process for the preparation of blends for use in fodder production constituted by meals of flours, and active principles, of reduced dustiness.

More particularly, the present invention relates to a process for the preparation of blends for use in fodder production and/or for livestock feeding, either soluble or not, of low dustiness, by means the addition to the carrier substance of an active principle and of easily applicable surfactants.

It is known that the active principles for use in fodder production, e.g. antibacterials such as Carbadox, due to their chemical-physical characteristics, and in particular due to their granulometric characteristics, give rise to the phenomenon of dustiness, and this causes several drawbacks in the use of such products, in particular as for the dangerousness for the users, but also due to the fact that in the blending step it is not possible to obtain a homogeneous product.

In fact, the active principles for fodder production show a granulometric composition having about 30% by weight lower than 10 μm in size; moreover, in case in which the active principle is constituted by Carbadox, the crystals are very crumbly and during the blending operations they tend to assume a still more reduced size.

Taking into account that the substances acting as the carrier, either alone or mixed to each other, have an unequal and considerably higher granulometry, the powder exiting from the blender is essentially constituted by Carbadox and this causes a non-homogeneous blending obtaining a product with a titer different from the desired value.

The blending operations though carried out in closed equipment, exhibit occasional leaks and the danger of exposure to dust to the user always present.

Moreover the danger of the inflammability and of the explosiveness of Carbadox thin powders, presents these powders from being conveyed by air freight.

Processes are known for the preparation of non-dusty blends for use in fodder production; as an example, according to Italian Pat. No. 1 046 986 blends are prepared of meal with a quinoxaline-1,4-dioxide antibacterial agent, such blends being made non-dusty by means of the addition of a non-toxic oil.

For this preparation to be efficient, it must be carried out in two steps: in the first step, a first share of the oil is blended with the meal, in the second step the antibacterial agent is mixed and in the third step the residual portion of the oil is mixed.

In addition to the complexity of the multi-step operations, the addition of the oil to the blend involves great labor in blending and the decrease of the freeflowng characteristics of the blend and does not favour the electrical conductivity.

It must be observed indeed that many active principles have such electrostatic characteristics, as to make it difficult to homogenize the blend, in that the active principle tends to accumulate in dead areas of the blender and on the walls thereof, causing also problems of powder auto-ignition and explosion.

We have now found a process for the obtainment of non-dusty blends of meals, or flours, with active principles for use in the fodder manufacturing, and/or for livestock feeding, which allows these drawbacks to be overcome, and in particular process for the production of a single step, highly free-flowing products.

Moreover, by means of this process the drawbacks due to the electrostatic discharges are eliminated: the blends obtained by means of the known technique show a resistivity of more than 20 MΩ, measured by means of a sensor at a depth of 15 cm and with a distance of 13 mm between the electrodes, whilst the blends obtained according to the present invention have a resistivity of 3 MΩ, as measured by the same technique.

The process for the preparation of non-dusty blends of meals or flours with active principles for use in the fodder manufacturing, according to the present invention, is characterized in that in a powder blender the supporting meal, or flour is loaded, and to it an anti-dust additive, containing a non-ionic, physiologically compatible surfactant, and the desired active principle, as a powder, is added, and the mixture is homogenized by blending.

These and other characteristics of the process according to the present invention shall be better evidenced by the following disclosure which relates to a preferred embodiment thereof, and which is reported to illustrative and not limitative purposes.

Into a blender of the type normally employed for the blending of powder-like substances, the meal or flour is loaded, which is intended to act as the support for the active principle. The blender may be e.g. of the horizontal type, with two blending reels or combined with blades, or of the shear and thrust type.

Examples of meals or flours suitable to the use in the present process are: cereal meals and flours and brans, byproducts related thereto, sugars, glutens, proteinic meals of vegetable and animal origin, both from fermentation and not, residual yeasts of industrial processes outcoming from fermentation, oil-seed extraction meals, ground mineral powders of either natural or chemical-industrial origin, alone or mixed to each other.

These meals or flours have, in general, the following characteristics: granulometry: 80% by weight comprised between 20 and 80 mesh; moisture: from 2 to 13% by weight.

Onto these meals, or flours, during the blending a non-ionic, physiologically compatible surfactant is sprayed.

The spraying is carried out by means of dispersers of micronized liquid, such as e.g. by means of compressed-air atomizer nozzles for pressurized liquid; before, or during, or after the addition of the surfactant, the active principle is added in a powder form; the homogenizing of the system is accomplished by blending.

Examples of non-ionic surfactants which may be used in the process according to the invention are: monoesters of propylene glycol and of alimentary fatty acids; stearyl-2-lactyl acid; acetic, lactic, citric, tartaric, monoacetyl-tartaric esters of mono- and -diglycerides of alimentary fatty acids; glycerol-polyethylene glycol ricinoleate; polyethylene glycol esters of soybean oil fatty acids; sorbitan monostearate; sorbitan tristearate; sorbitan monolaurate; sorbitan monooleate, sorbitan monopalmitate, propylene glycol alginate.

Moreover, mixtures of these surfactants with polyethylene glycol and/or with propylene glycol and/or with glycerol may be used.

Also liquid preservatives acting as mould inhibitors, such as propionic acid, formic acid, lactic acid and others may be added. These substances are preferably added to the mixture to be sprayed and serve also to make it more fluid, and completely mixable.

The active principle, which is incorporated inside the blend, e.g., 2-formylquinoxaline-1,4-dioxide carbomethoxyhydrazone (carbadox);1,5-bis (s-nitro-z-furyl)-3-pentadienone ambinohydrozone (Nitrovin); N-(z-hydroxyethyl)-3-methyl-2-quinoxalinecarboxamide 1,4-dioxide (olaquindox); N-(S-nitro-2-fur-furylidene-3-amino-2-oxazolidinone (Furazolidone); 1,2-dimethyl-S-motrp-1 H-imidazole (Dimetridazole) and others, shows the following granulometric characteristics: 90–95% by weight <80 mesh.

The amount of surfactant to be used is comprised within the range of from 0.5 to 80% and preferably of from 1 to 2% by weight relatively to the flour or meal, the amount of polyethylene glycol or of propylene glycol or of glycerol is comprised within the range of from 0.5 to 10% and preferably of from 2 to 4% by weight relatively to the meal or flour and the amount of mould inhibiting preservative liquids is comprised between 0.1 and 5% by weight and preferably between 0.3 and 2% by weight relatively to the meal or flour.

The amount of active principle in the blend is comprised within the range of from 2 to 80% and preferably of from 5 to 20% by weight.

The following Examples are reported to the purpose of illustrating the invention, without being limitative thereof.

EXAMPLE 1

Into a blender for powder-like substances of the horizontal type, 840 kg of a meal constituted by corn fodder meal 40%, soybean meal 40% and calcium carbonate 20% by weight, and 102.5 kg of Carbadox at 99.2% by weight and having the granulometry: 93% by weight <80 mesh, were charged.

By means of four sprayers with compressed-air atomizer nozzles for pressurized liquids, 15 kg of glycerol-polyethylene glycol ricinoleate pre-mixed with 35 kg of 1,2-propanediol and 10 kg of propionic acid were added.

The spraying was carried out with the blender being run, in a 5 minute time; the blending was thereafter continued for a further 20 minutes.

The incorporation of Carbadox into the meal-surfactant blend resulted to be very homogeneous and the blend obtained did not give rise to a noticeable dust formation and moreover showed highly free-flowing characteristics, and resistivity lower than 3 MΩ, as measured with the sensor being at a depth of 15 cm, and with a distance of 13 mm between the electrodes.

The dustiness of the blend obtained was determiend by the following method, which has been got ready to the purpose of measuring the dustiness of the Carbadox-meals blend under the conditions of use thereof by the users. The contents of the bag containing the Carbadox-meal blend is poured by an operator into a flat-bottomed tray placed close to his feet, and at the same time samples are drawn of atmosphere contaminated by the dust possibly suspended therein.

The sampling is carried out by using the "SAS Compact" (Surface Air System) equipment of pbi International, equipped with a modified head onto which Sartorius filters of regnerated cellulose (ref. SM 11606) are installed.

The whole sampling equipment is positioned by means of a fixed frame at a level of about 150 cm from the plane onto which the blend is poured; at the end, the filter is disassembled from the head, and possibly deposited Carbadox is extracted, and the determination is continued by HPLC (High-Pressure Liquid Chromatography) as described by Lowie et al. in J. Assoc. Off. Anal. Chem. (Vol. 66, No. 3, pages 602–605, 1983).

The following results were obtained: amount of Carbadox lower than 10 $\mu g/m^3$ of atmospheric air (data obtained from three measurements).

(COMPARISON) EXAMPLE 2

Example 1 was repeated by using the same operating procedures, the same equipment and the same amounts of substances, with the exception that the anti-dust mixture according to the invention was not added.

The dustiness of the blend obtained was determined by the method described under Example 1 and from three separate tests the following results were obtained.

Carbadox $mg/m^3$ of atmospheric air:

Test No. 1:4 $mg/m^3$

Test No. 2:6 $mg/m^3$

Test No. 3:23 $mg/m^3$.

Sensor-measured resistivity higher than 20 MΩ.

EXAMPLE 3

Example 1 was repeated, by using the same equipment, the same operating procedures and the same amounts of substances, with the exception that 8 kg of glycerol-polyethylene glycol ricinoleate, 30 kg of glycerol and 5 kg of lactic acid were used.

The dustiness of the blend obtained was determined by the method described under Example 1 and the following results were obtained: Carbadox amount lower than 15 μg per $m^3$ of atmospheric air.

Resistivity lower than 3 MΩ.

EXAMPLE 4

Example 1 was repeated, by using the same equipment, the same operating procedures and the same amounts of substances, with the exception that as the anti-dust agent 15 kg of polyoxyethylene-sorbitan monooleate and 45 kg of 1,2-propane-diol were used.

The dustiness of the blend obtained was determined by the method described in Example 1, and the following results were obtained: Carbadox content lower than 10 $\mu g/m^3$ of atmospheric air (data obtained form three measurements).

Sensor-measured resistivity: lower then 3 MΩ.

I claim:

1. A livestock feed having improved antistatic properties, comprising:
   (a) a carrier feed meal or feed flour;
   (b) an antibacterial compound, said compound's granulometric characteristic bieng 80 mesh for 90 to 95% by weight of the compound, said compound comprising 2 to 80% of the feed;
   (c) a non-ionic surfactant physiologically compatible with livestock feed said surfactant present in an amount betwen 0.5 and 8% by weight of the feed; and
   (d) a liquid selected from the group consisting of propylene glycol, glycerol, and polyethylene glycol in an amount between 0.5 and 10% by weight of the feed.

2. A livestock feed having improved antistatic properties, comprising:

(a) a carrier feed meal or feed flour;
(b) an antibacterial compound, said compound's granulometric characteristic being 80 mesh for 90 to 95% by weight of the compound, said compound comprising 2 to 80% of the feed;
(c) A non-ionic surfactant selected form the group consisting of monoesters of propylene glycol and of alimentary fatty acids, esters of mono- and -diglycerides of alimentary fatty acids and a carboxylic acid selected from the group consisting of acetic, lactic, citric, tartaric, and monoacetyltartaric acid, glycerol-polyethylene glycol ricinoleate, polyethylene glycol esters of soybean oil fatty acids, sorbitan monostearate, sorbitan tristerate, sorbitan monolaurate, sorbitan monooleate, sorbitan monopalmitate, and propylene glycol alginate, in an amount between 0.5 and 8% by weight of the feed; and
(d) a liquid selected from the group consisting of propylene glycol, glycerol, and polyethylene glycol in an amount between 0.5 and 10% by weight of the feed.

3. The livestock feed of claim 1, wherein said antibacterial compound is selected from the group consisting of 2-formylquinoxaline-4,4-dioxide carbomethoxyhydrozone; 1,5-bis(5 nitro-2-furyl)-3-pentadienone amidinohydrozone; N-(2-hydroxy-ethyl)-3-methyl-2-quinoxalinecarboxamide 1,4 dioxide; N-(5-nitro-2-furfurylidene-3-amino-2-oxazolidinone; and 1,2-dimethyl-5-nitro-1H-imidazole.

4. The livestock feed of claim 1, wherein said antibacterial compound is 2-formylquinoxaline-1,4-dioxide carbomethoxyhydrozone, and wherein 30% of said compound is comprised of particles less than 10 microns.

5. A livestock feed having improved antistatic properties, comprising:
(a) a carrier feed meal or feed flour;
(b) an antibacterially effective amount of 2-forymlquinoxaline 1-4-dioxide carboxymethyl hydrozone, its granulometric characteristic being 10 microns for 30% by weight of the compound;
(c) non-ionic surfactant selected from the group consisting of monoesters of propylene glycol and of alimentary fatty acids, esters of mono- and -diglycerides of alimentary fatty acids and a carboyxlic acid selected from the group consisting of acetic, lactic, citric, tartaric, and monoacetyltartaric acid, glycerol-polyethylene glycol ricinoleate, polyethylene glycol esters of soybean oil fatty acids, sorbitan monostearate, sorbitan tristerate, sorbitan monolaurate, sorbitan monooleate, sorbitan monopalmitate, and propylene glycol alginate, in an amount between 0.5 and 8% by weight of the feed; and
(d) a liquid selected from the group consisting of propylene glycol, glycerol, and polyethylene glycol in an amount between 0.5 and 10% by weight of the feed.

6. A process for preparing a livestock feed having improved antistatic properties, comprising:
(a) a carrier feed meal or feed flour;
(b) an antibacterial compound, said compound's granulometric characteristic being 80 mesh for 90 to 95% by weight of the compound, and said compound comprises 2 to 80% of the feed;
(c) and a mixture of a non-ionic surfactant physiologically compatible with livestock feed said surfactant present in an amount between 0.5 and 8% by weight of the feed, and a liquid selected from the group consisting of propylene glycol, glycerol, and polyethylene glycol in an amount between 0.5 and 10% by weight of the feed;
said process comprising spraying said mixture onto the carrier feed and said antibacterial compound to form a feed mixture; and
mixing said feed mixture to form a homogeneous feed having improved antistatic properties.

7. The process according to claim 5 wherein said non-ionic surfactant is selected from the group consisting of monoesters of propylene glycol and of alimentary fatty acids, esters of mono- and -diglycerides of alimentary fatty acids and a carboxylic acid selected from the group consisting of acetic, lactic, citric, tartaric, and monoacetyltartaric acid, glycerolpolyethylene glycol ricinoleate, polyethylene glycol esters of soybean oil fatty acids, sorbitan monosterate, sorbitan tristerate, sorbitan monolaurate, sorbitan monooleate, sorbitan monopalmitate, and propylene glycol alginate, in an amount between 0.5 and 8% by weight of the feed.

* * * * *